US012354613B2

(12) United States Patent
Bruhn et al.

(10) Patent No.: US 12,354,613 B2
(45) **Date of Patent: *Jul. 8, 2025**

(54) METHODS AND APPARATUSES FOR DTX HANGOVER IN AUDIO CODING

(71) Applicant: Telefonaktiebolaget LM Ericsson (publ), Stockholm (SE)

(72) Inventors: Stefan Bruhn, Sollentuna (SE); Tomas Jansson Toftgård, Uppsala (SE); Martin Sehlstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 94 days.

This patent is subject to a terminal disclaimer.

(21) Appl. No.: 17/948,622

(22) Filed: Sep. 20, 2022

(65) Prior Publication Data

US 2023/0080183 A1 Mar. 16, 2023

Related U.S. Application Data

(63) Continuation of application No. 16/409,305, filed on May 10, 2019, now Pat. No. 11,475,903, which is a (Continued)

(51) Int. Cl.
*G10L 19/012* (2013.01)
*G10L 19/005* (2013.01)
(Continued)

(52) U.S. Cl.
CPC .......... *G10L 19/012* (2013.01); *G10L 19/005* (2013.01); *G10L 19/02* (2013.01);
(Continued)

(58) Field of Classification Search
CPC .............................. G10L 19/012; G10L 19/00
See application file for complete search history.

(56) References Cited

U.S. PATENT DOCUMENTS 5,978,761 A 11/1999 Johansson
6,504,364 B1 1/2003 Eidenvall
(Continued)

FOREIGN PATENT DOCUMENTS

CN 1514998 7/2004
CN 101213591 7/2008
(Continued)

OTHER PUBLICATIONS

G.729—Benyassine, et al. "ITU-T Recommendation G.729 Annex B: a silence compression scheme for use with G.729 optimized for V.70 digital simultaneous voice and data applications," IEEE Communications Magazine Sep. 1997. (Year: 1997).*
(Continued)

*Primary Examiner* — Feng-Tzer Tzeng
(74) *Attorney, Agent, or Firm* — Rothwell, Figg, Ernst & Manbeck, P.C.

(57) ABSTRACT

Transmitting node and receiving node for audio coding and methods therein. The nodes being operable to encode/decode speech and to apply a discontinuous transmission (DTX) scheme comprising transmission/reception of Silence Insertion Descriptor (SID) frames during speech inactivity. The method in the transmitting node comprising determining, from amongst a number N of hangover frames, a set Y of frames being representative of background noise, and further transmitting the N hangover frames, comprising at least said set Y of frames, to the receiving node. The method further comprises transmitting a first SID frame to the receiving node in association with the transmission of the N hangover frames, where the SID frame comprises information indicating the determined set Y of hangover frames to the receiving node. The method enables the receiving node to generate comfort noise based on the hangover frames most adequate for the purpose.

11 Claims, 11 Drawing Sheets

Related U.S. Application Data continuation of application No. 14/769,603, filed as application No. PCT/SE2013/051496 on Dec. 12, 2013, now Pat. No. 10,319,386.

(60) Provisional application No. 61/768,028, filed on Feb. 22, 2013.

(51) Int. Cl.

| | |
|---|---|
| *G10L 19/02* | (2013.01) |
| *G10L 19/16* | (2013.01) |
| *G10L 25/51* | (2013.01) |
| *G10L 25/69* | (2013.01) |
| *G10L 25/84* | (2013.01) |

(52) U.S. Cl.

CPC ............ *G10L 19/173* (2013.01); *G10L 25/51* (2013.01); *G10L 25/69* (2013.01); *G10L 25/84* (2013.01)

(56) References Cited

U.S. PATENT DOCUMENTS

| | | | |
|---|---|---|---|
| 7,231,348 | B1 | 6/2007 | Gao |
| 7,406,096 | B2 | 7/2008 | El-Maleh |
| 2002/0101844 | A1 | 8/2002 | El-Maleh |
| 2002/0120440 | A1 | 8/2002 | Zhang |
| 2004/0110539 | A1 | 6/2004 | El-Maleh |
| 2006/0217976 | A1 | 9/2006 | Gao |
| 2007/0147327 | A1 | 6/2007 | Jin |
| 2008/0027717 | A1 | 1/2008 | Rajendran |
| 2009/0043567 | A1 | 2/2009 | Bruhn |
| 2009/0063165 | A1 | 3/2009 | Ojala |
| 2009/0234645 | A1 | 9/2009 | Bruhn |
| 2010/0063805 | A1 | 3/2010 | Bruhn |
| 2010/0106490 | A1 | 4/2010 | Svedberg |
| 2010/0114567 | A1 | 5/2010 | Bruhn |
| 2010/0280823 | A1 | 11/2010 | Shlomot |
| 2010/0324918 | A1 | 12/2010 | Almgren |
| 2011/0004471 | A1 | 1/2011 | Schandl |
| 2011/0038362 | A1 | 2/2011 | Vos |
| 2011/0153336 | A1 | 6/2011 | Grancharov |
| 2015/0235648 | A1 | 8/2015 | Toftgard |

FOREIGN PATENT DOCUMENTS

| | | | | | |
|---|---|---|---|---|---|
| CN | 101335000 | | | 12/2008 | |
| CN | 101366077 | | | 2/2009 | |
| CN | 101430880 | | | 5/2009 | |
| CN | 101651752 | A | * | 2/2010 | |
| CN | 101790754 | | | 7/2010 | |
| CN | 102760441 | | | 10/2012 | |
| EP | 2143103 | A1 | * | 1/2010 | ........... G10L 19/012 |
| EP | 2224428 | B1 | * | 6/2015 | ........... G10L 19/012 |

OTHER PUBLICATIONS

Second Chinese Office Action with English translation dated Dec. 5, 2017, issued in Chinese Patent Application No. 201380073608.0, 9 pages.

Chinese Search Report dated Apr. 25, 2017, in Chinese Application No. 201380073608.0, 1 page.

Chinese Office Action dated May 4, 2017, in Chinese Application No. 201380073608.0 with English translation, 7 pages.

3GPP: "Mandatory speech codec speech processing functions; Adaptive Multi-Rate (AMR) speech codec; Comfort noise aspects (Release 6)", 3rd Generation Partnership Project (3GPP); Technical Report (TR), XX, XX, Dec. 1, 2004, 12 pages, XP008095169.

"3rd Generation Partnership Project; Technical Specification Group Services and System Aspects; Mandatory speech codec speech processing functions; Adaptive Multi-Rate (AMR) speech codec frame structure (Release 6)", 3GPP Standard; 3GPP TS 26.101, 3rd Generation Partnership Project (3GPP), Mobile Competence Centre; 650, Route Des Lucioles; F-06921 Sophia-Antipolis Cedex, France, No. V6.0.0, Sep. 1, 2004, pp. 1-20, XP050369760.

International Search Report and Written Opinion dated Mar. 4, 2014 issued in International Application No. PCT/SE2013/051496. (10 pages).

International Preliminary Report on Patentability dated Jun. 2, 2015 issued in International Application No. PCT/SE2013/051496. (12 pages).

Extended European Search Report dated Sep. 6, 2019 issued in European Patent Application No. 19173460.7 (6 pages).

3GPP TS 26.093 V3.1.0 (Dec. 1999); 3rd Generation Partnership Project; Technical Specification Group Services and System Aspects; Mandatory Speech Codec speech processing functions AMR Speech Codec; Source Controlled Rate operation; (3G TS 26.093 version 3.1.0) (Dec. 1999). (30 pages).

* cited by examiner

METHODS AND APPARATUSES FOR DTX HANGOVER IN AUDIO CODING

CROSS-REFERENCE TO RELATED APPLICATIONS

This application is a continuation of U.S. application Ser. No. 16/409,305, filed on May 10, 2019 (status pending), which is a continuation of U.S. application Ser. No. 14/769,603, having a section 371(c) date of Aug. 21, 2015 (now U.S. Pat. No. 10,319,386, issued on Jun. 11, 2019), which is the national stage entry of International Patent Application No. PCT/SE2013/051496, filed on Dec. 12, 2013, which claims priority to U.S. Provisional Patent Application No. 61/768,028, filed Feb. 22, 2013. The above identified applications and publication are incorporated by this reference.

TECHNICAL FIELD

The solution described herein relates generally to audio coding, and in particular to hangover frames associated with discontinuous transmission (DTX) in audio coding.

BACKGROUND

Current audio or speech coding standards like 3GPP AMR (3GPP TS 26.071) and AMR-WB (3GPP TS 26.171) as well as various ITU-T speech coding standards (e.g. ITU-T Recommendation G.729, ITU-T Recommendation G.718) include a discontinuous transmission scheme (DTX) that suspends the speech transmission during speech inactivity, and instead transmits Silence Insertion Descriptor (SID) frames at significantly reduced bit rate and frame transmission rate as compared to the ones used for encoded active speech. The purpose of DTX is to increase transmission efficiency, which in turn reduces the cost for speech communication and/or increases the number of simultaneously possible telephony connections in a given communication system.

Current state-of-the-art communication systems with DTX transmit regular speech coding frames during active speech segments. During inactive segments, e.g. speech pauses, these systems rather transmit SID frames from which the receiver generates so-called comfort noise as a substitution signal for the inactivity signal. In order to achieve the best possible DTX efficiency, it is desirable that speech coding frames are only transmitted during active speech and not in inactive segments, e.g. during speech pauses.

In order to make this distinction between speech and inactivity, a voice activity detector (VAD) is used at the encoding, or sending, side. During frames corresponding to active speech segments, a VAD flag is raised. This concept suffers in practice, and especially in situations of speech in background noise, from VAD classification errors. That is, periods of inactivity are classified as periods of active speech, and/or vice versa. One of the main problems of VADs is the detection of the speech end points, i.e. the precise point in time where the signal changes from active speech to inactivity. The main reason for this problem is that many speech offsets are slowly decaying before the speech really stops, such that the ending of the talk spurts may very well be covered by background noise. The consequence of this problem may be that such speech offsets are classified as inactivity which may result in that the corresponding signal frames are not encoded, transmitted and reconstructed as active speech but rather as a silence signal for which comfort noise frames are generated. This means that speech offsets (end of speech periods) may be perceived as clipped, leading to significantly reduced quality and even intelligibility of the reconstructed speech. In other words this may lead to a bad user experience.

Current state-of-the-art codecs like AMR and AMR-WB solve this problem by simply delaying the start of the DTX operation with comfort noise synthesis a number of frames after the VAD-detected offset. This is done with a DTX control logic at the encoder, which extends or adds a time period during which an input signal is encoded as active speech even though the VAD flag indicates inactivity. This period is called hangover period and in case of AMR and AMR-WB the hangover period is 7 frames long.

The hangover period is not only used as a means for avoiding speech back-end (or offset) clipping, but also for SID frame parameter analysis. In case of AMR and AMR-WB the first SID frame parameters after a (sufficiently long) talk spurt are not transmitted, but rather computed by the decoder from the speech frame parameters received and stored during the hangover period (3GPP TS 26.092; 3GPP TS 26.192). The purpose of making the SID frame parameter calculation based on the received speech frame parameters during the hangover period is to save transmission resources which should otherwise have been spent on SID frame transmission and to minimize the effect of potential transmission errors on the first SID frame parameters.

The main problem with the hangover period in the described state-of-the-art solutions is that it compromises the efficiency of the DTX scheme. The hangover frames are encoded as active speech despite that they are likely inactivity frames. If the speech comprises frequent separate talk spurts in between inactivity periods, then a significant number of frames are encoded with high bit rate, thus as speech frames, rather than as comfort noise frames.

A related problem arises if the hangover period is shortened in order to improve the efficiency of the DTX scheme. The shorter the hangover period, the more likely it is that it does not properly represent the inactivity noise signal. This may then lead to audible degradations of the comfort noise synthesis immediately at the end of talk spurts.

In AMR and AMR WB the encoder and the decoder keep track of the DTX hangover frames using a state-machine that needs to be synchronous in the encoder and the decoder.

SUMMARY

It would be desirable to, at an audio decoder side, generate comfort noise, which is representative of the background noise at an audio encoder side. Further, it is desirable to do this in an efficient way, using only a minimum of resources. Thus, an objective of the herein suggested solution is to enable generation of comfort noise which is representative of background noise at an encoder side, and to do so using a limited amount of resources.

The solution suggested herein increases the efficiency of speech transmissions with DTX without compromising the quality of the comfort noise synthesis at the end of talk spurts.

According to a first aspect, a method performed by a transmitting node or encoding node is provided. The transmitting node is operable to encode audio, such as speech, and to communicate with other nodes or entities, e.g. in a communication network. The transmitting node is further operable to apply a DTX scheme comprising transmission of SID frames during speech inactivity. The method comprises determining, from amongst a number N of hangover frames, a set Y of frames being representative of background noise. The method further comprises transmitting the N hangover frames, comprising said set Y of frames, to a receiving node. The method further comprises transmitting a first SID frame to the receiving node in association with the transmission of the N hangover frames, where the SID frame comprises information indicating the determined set Y of hangover frames to the receiving node. The above method enables the receiving node to generate comfort noise based on the set Y of hangover frames.

According to a second aspect, a method performed by a receiving node or decoding node is provided. The decoding node is operable to decode audio, such as speech, and to communicate with other nodes or entities, e.g. in a communication network. The decoding node is further operable to apply a DTX scheme comprising reception of SID frames and generation of comfort noise during speech inactivity. The method comprises receiving N hangover frames from a transmitting node. Further, a first SID frame is received in association with the N hangover frames. A set Y of hangover frames, from amongst the received number N of hangover frames, is determined based on information in the received SID frame. Further, comfort noise is generated based on the set Y of hangover frames.

According to a third aspect, a transmitting or encoding node is provided. The transmitting node is operable to encode audio, such as speech, and is operable to communicate with other nodes or entities, e.g. in a communication network. The transmitting node is further operable to apply a DTX scheme comprising transmission of SID frames during speech inactivity. The transmitting node comprises processing means, for example in form of a processor and a memory, wherein said memory is containing instructions executable by said processor. The processing means are operative to determine, from amongst a number N of hangover frames, a set Y of frames being representative of background noise. The processing means being further operative to transmit the N hangover frames, comprising said set Y of frames, to a receiving node; and further to transmit a first SID frame to the receiving node in association with the transmission of the N hangover frames, where the SID frame comprises information indicating the determined set Y of hangover frames to the receiving node.

According to a fourth aspect, a receiving node or decoding node is provided. The receiving node is operable to decode audio, such as speech, and is operable to communicate with other nodes or entities. The transmitting node is further operable to apply a DTX scheme comprising receiving of SID frames during speech inactivity. The receiving node comprises processing means, for example in form of a processor and a memory, and wherein said memory is containing instructions executable by said processor. The processing means are operative to receive N hangover frames from a transmitting node; and further to receive a first SID frame in association with the N hangover frames. The processing means are further operative to determine, based on information in the received SID frame, a set Y of hangover frames, from amongst the number N of hangover frames; and to generate comfort noise based on the set Y of hangover frames.

According to a fifth aspect, a computer program is provided, comprising computer program code, which when run in a transmitting node causes the transmitting node to perform the method according to the first aspect.

According to a sixth aspect, a computer program is provided, comprising computer program code, which when run in a receiving node causes the receiving node to perform the method according to the second aspect.

According to a seventh aspect, a computer program product is provided, comprising the computer program according to the fifth aspect.

According to an eight aspect, a computer program product is provided, comprising the computer program according to the sixth aspect.

BRIEF DESCRIPTION OF THE DRAWINGS

The foregoing and other objects, features, and advantages of the solution disclosed herein will be apparent from the following more particular description of embodiments as illustrated in the accompanying drawings. The drawings are not necessarily to scale, emphasis instead being placed upon illustrating the principles of the solution disclosed herein.

FIGS. *6a* and *6b* are flow charts for hangover decoder.

FIGS. *7a* and *7b* are flow charts illustrating exemplifying embodiments of a method performed by a transmitting or encoding node, according to the herein suggested solution.

Figure 8:
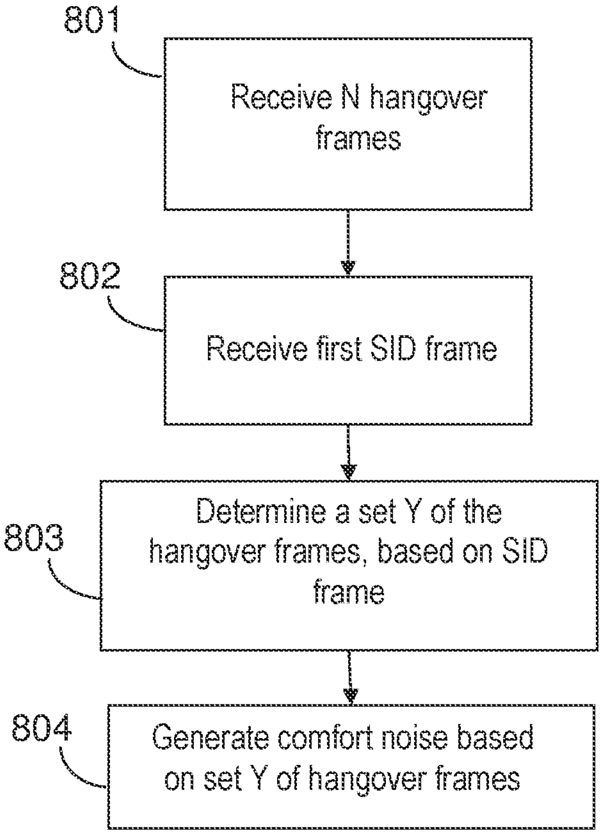

FIG. 8 is a flow chart illustrating an exemplifying embodiment of a method performed by a receiving or decoding node, according to the herein suggested solution.

Figure 9:
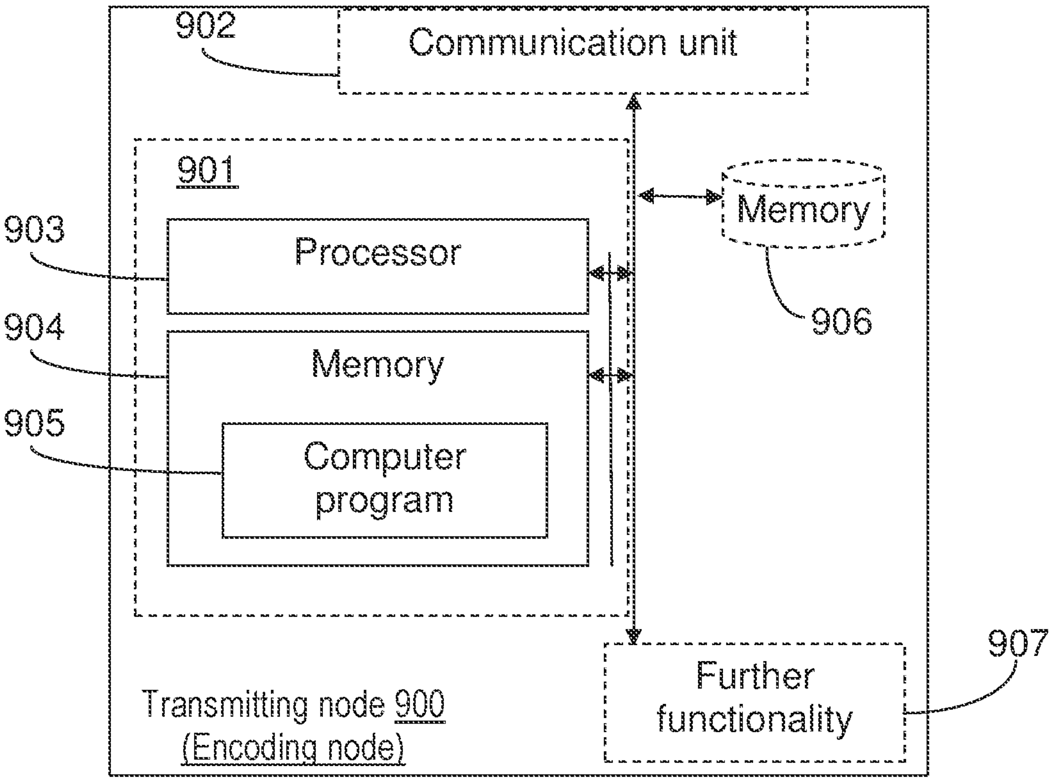
Figure 10:
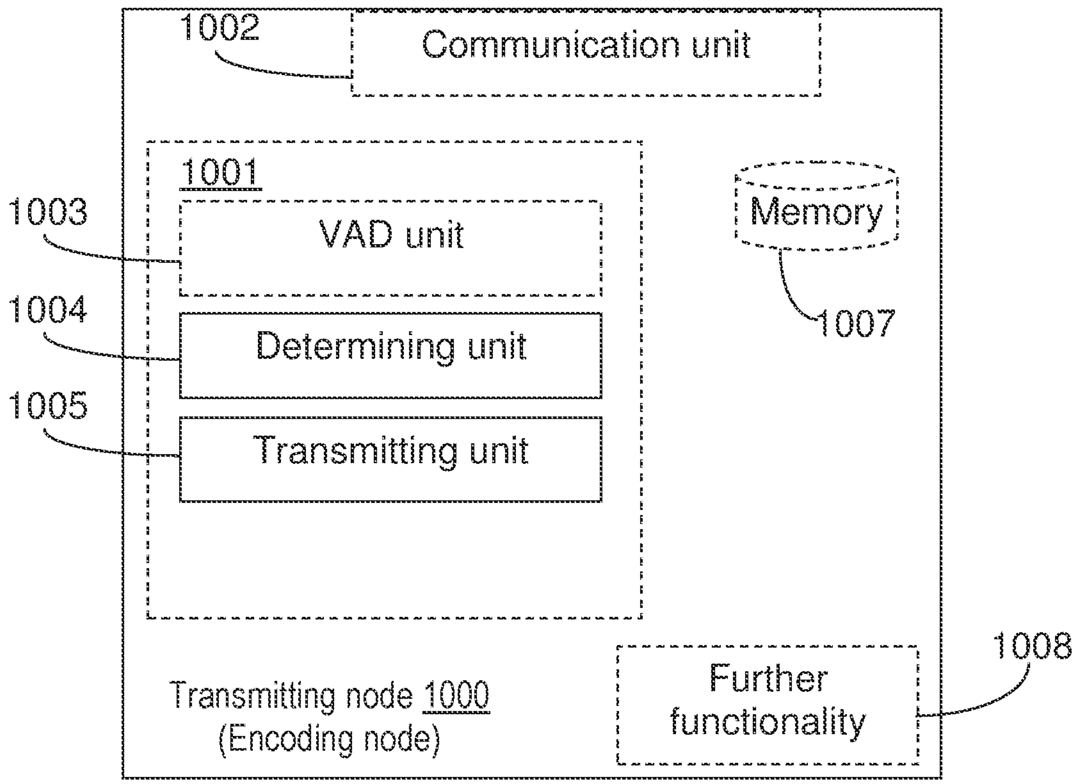

FIGS. 9-10 are block diagrams illustrating exemplifying embodiments of a transmitting node, according to the herein suggested solution.

Figure 11:
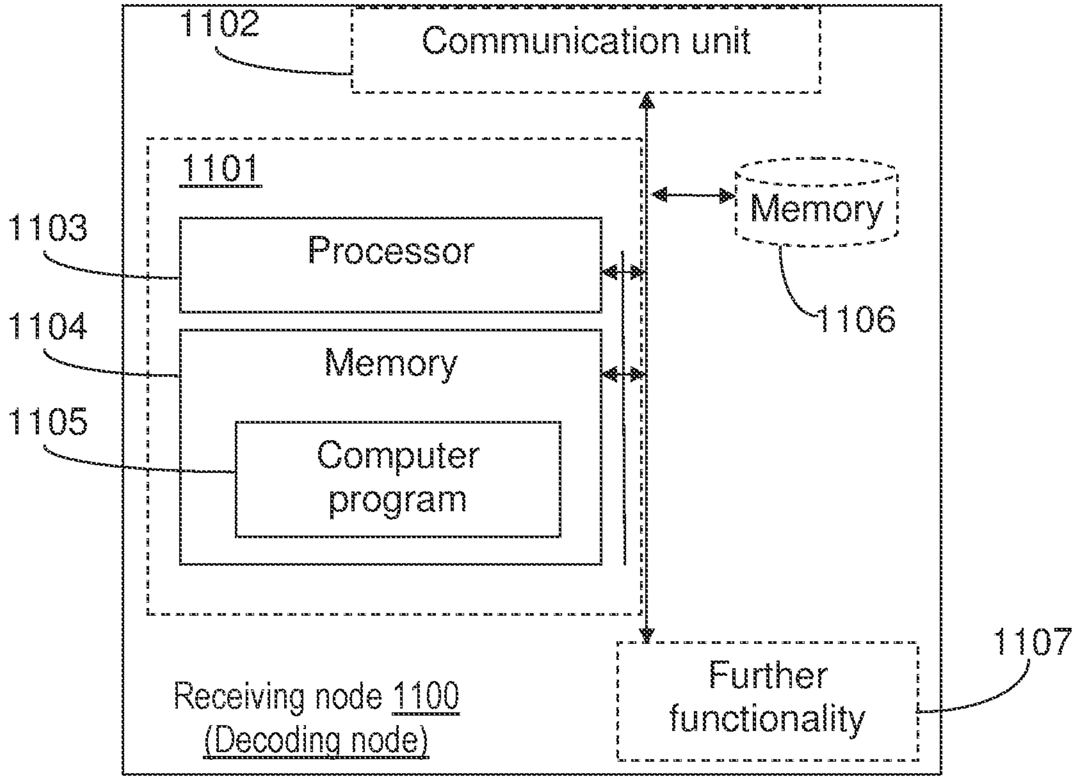
Figure 12:
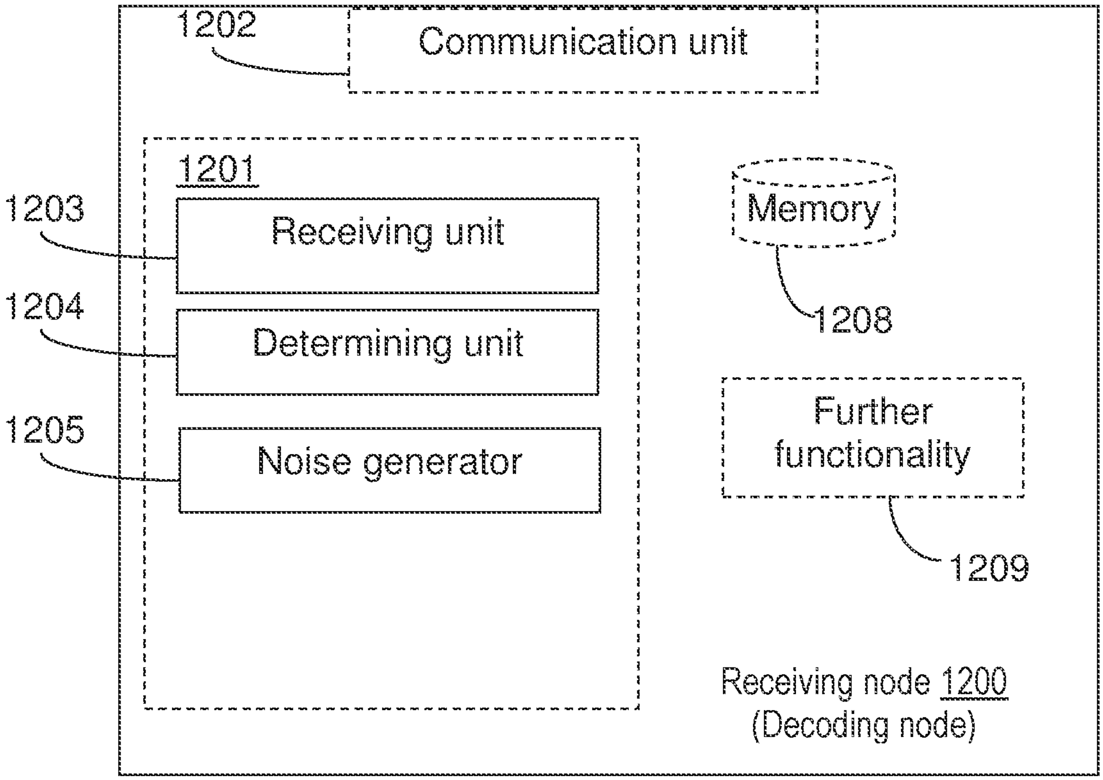

FIGS. 11-12 are block diagrams illustrating exemplifying embodiments of a receiving node, according to the herein suggested solution.

DETAILED DESCRIPTION

As previously mentioned: in communication systems utilizing discontinuous transmission (DTX), the transmission efficiency is reduced when hangover techniques are used to avoid quality degradation due to incorrect voice activity detector (VAD) decisions.

In so-called inactive signal segments, e.g. speech pauses, comfort noise is generated, at a decoder side, using information transmitted in silence insertion descriptor (SID) frames. If the hangover period also is used for SID parameter analysis the length of it is preferably not just as long as required to cover incorrect VAD decisions, but slightly longer to capture background signal characteristics. Generally, the likelihood of appropriate comfort noise generation will increase with longer hangover periods. On the other hand long hangover periods decrease the efficiency of the communication system utilizing DTX as inactive signal frames will be transmitted as speech signal frames at a higher bit rate and frame transmission rate. In communication systems using these techniques there is consequently a compromise between the transmission efficiency and the likelihood of representative comfort noise.

Figure 1:
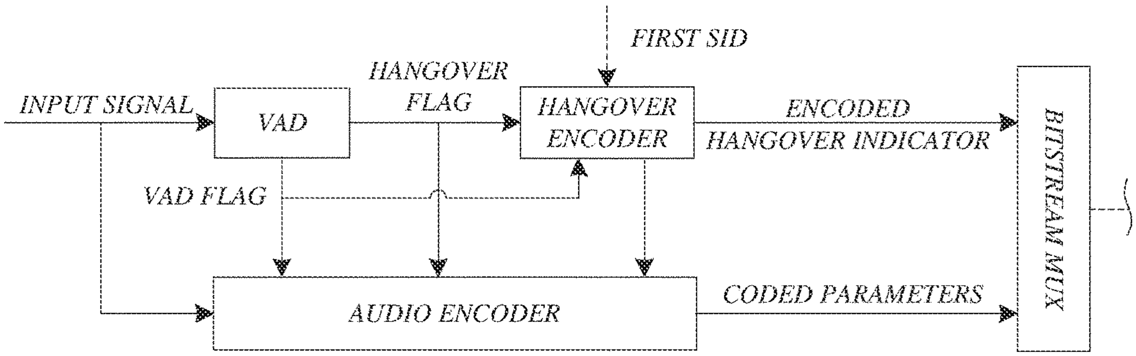
FIG. 1 is a block diagram of encoder.

A hangover period after a speech offset may be adaptive. For the encoder this means that upon a VAD decision switching from 1 (=active speech) to 0 (=inactivity) an adaptive hangover period is added. Information specifying the frames belonging to the hangover period may be transmitted with the first SID frame after the hangover period. In FIG. 1, a schematic block diagram of such an encoder is shown.

Figure 2:
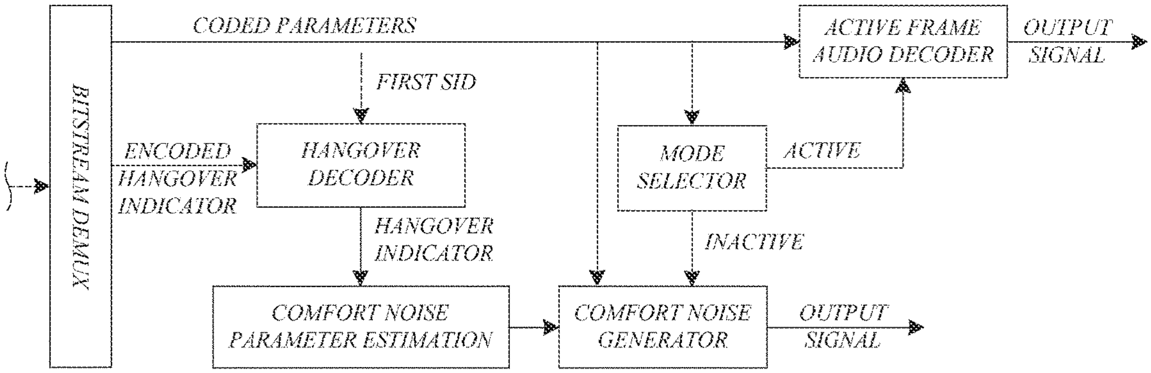
FIG. 2 is a block diagram of decoder operating in DTX.

The decoder may receive, e.g. with the first SID frame, the indication of which of the previously received active speech frames that belong to the hangover period. The coded speech information of the frames belonging to the hangover period may subsequently be used for decoder-side SID parameter calculation. In FIG. 2, a schematic block diagram of the decoder is shown.

In the following description, for purposes of explanation and not limitation, specific details are set forth such as particular architectures, interfaces, techniques, etc. in order to provide a thorough understanding of the concept described herein. However, it will be apparent to those skilled in the art that the described concept may be practiced in other embodiments that depart from these specific details. That is, those skilled in the art will be able to devise various arrangements which, although not explicitly described or shown herein, embody the principles of the described concept and are included within its spirit and scope. In some instances, detailed descriptions of well-known devices, circuits, and methods are omitted so as not to obscure the description according to the present concept with unnecessary detail. All statements herein reciting principles, aspects, and embodiments of the described concept, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein can represent conceptual views of illustrative circuitry or other functional units embodying the principles of the solution. Similarly, it will be appreciated that any flow charts, state transition diagrams, pseudo-code, and the like represent various processes which may be substantially represented in computer readable medium and so executed by a computer or processor, whether or not such computer or processor is explicitly shown.

The functions of the various elements including functional blocks, including but not limited to those labeled or described as e.g. “computer”, “processor” or “controller”, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to Application Specific Integrated Circuit(s) (ASICs), and (where appropriate) state machines capable of performing such functions.

Figure 3:
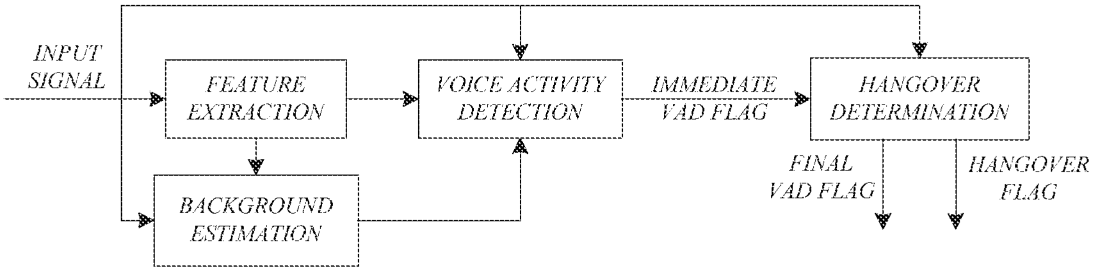
FIG. 3 is a block diagram of VAD and hangover determination logic.

In exemplifying embodiments of the herein suggested solution, the length of a hangover period, i.e. number of hangover frames, may be variable and adaptive. An adaptive hangover period may be generated e.g. in response to the VAD decision and a further indicator. In FIG. 3 a schematic block diagram of the VAD is shown. The immediate VAD decision may be a flag corresponding to the immediate speech/inactivity classification of the VAD. Whenever the VAD classifies a signal frame as active speech this flag may be raised, and otherwise it may be lowered. A hangover flag, may be introduced to control the length of the added hangover period after the immediate VAD flag has been lowered. This is preferably done such that it is ensured that the signal of the hangover frames mainly comprises a representative portion of the background noise and that potentially remaining speech portions are negligible. This is done with the purpose to allow a reliable SID parameter estimation at a decoding side, which estimation is representative for the inactivity noise signal and which is not affected by the potentially remaining speech portions. A useful measure to base the hangover flag upon is the estimated signal to noise ratio (SNR), which compares the estimated level of the remaining speech with the estimated inactivity noise level. For example, when this SNR estimate is above a certain threshold, the hangover flag may be raised and when it falls below said threshold the hangover period may end. It is to be noted that the hangover determination logic may generate a final VAD flag that could be different from the immediate VAD flag on its input.

Figure 4:
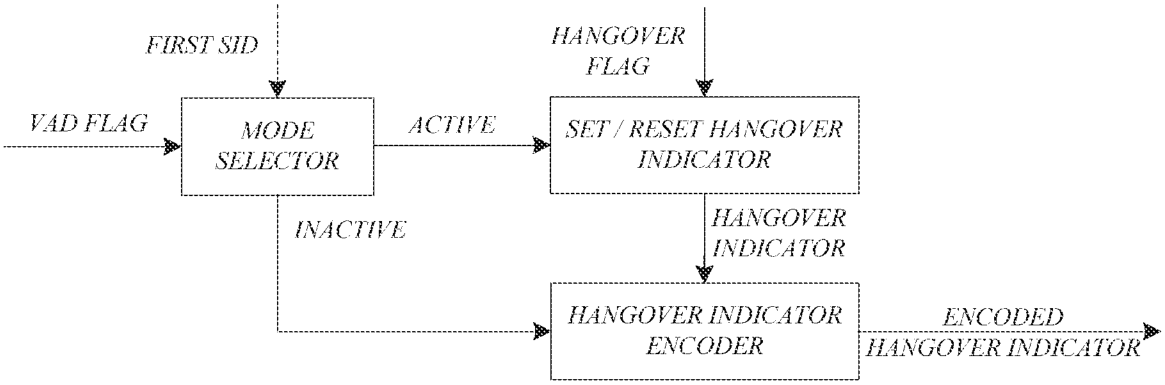
FIG. 4 is a block diagram of hangover encoder.
Figure 5:
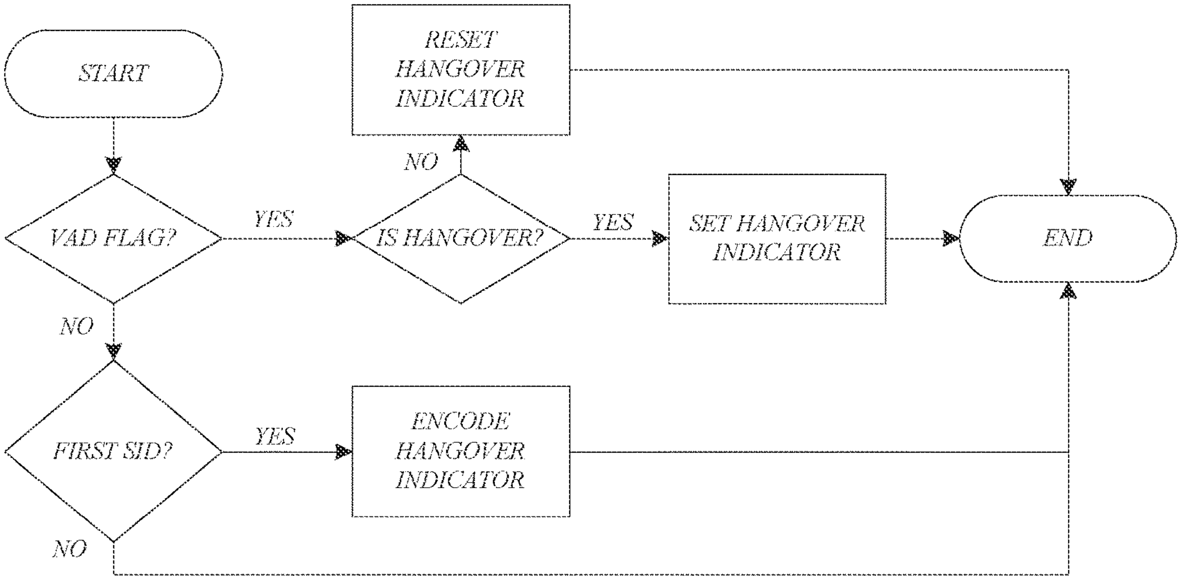
FIG. 5 is a flow chart for hangover encoder.

For example, the length of the hangover period may be adapted in response to the estimated SNR. This assumes that the SNR decreases at the end of a talk spurt. The adaptation takes into account that the degree of SNR decrease may be varying from one talk spurt to another. The result is that the length of the hangover period in frames is a variable parameter. According to an exemplifying embodiment, this hangover length, i.e. the hangover indicator, is encoded and transmitted to the decoder. A schematic block diagram of a hangover encoder is presented in FIG. 4. In addition to the VAD and hangover flags the exemplifying hangover encoder uses a first SID flag. The first SID flag may indicate if the current frame is the first SID following active signal coding. It should be noted that the flags do not necessarily have to be explicitly signaled specific variables, but could be implicit, e.g. derivable from other encoder state variables. The encoded length of the hangover period may be transmitted as part of the information comprised in the first transmitted SID frame after the end of the transmission of active speech frames. FIG. 5 shows a generic flow-chart for the hangover indicator encoder.

According to an exemplifying embodiment of the herein suggested solution, the length of the hangover period after the falling immediate VAD flag is adapted in such a way that the set of frames to be considered for SID parameter estimation is a variable. That is, the number of hangover frames may be fixed or variable, but the set of frames to be considered for determining of SID parameters for comfort noise generation is not necessarily equal to the number of hangover frames. In this approach, it is assumed that there is a measure that indicates the suitability of each frame of the hangover period following the falling immediate VAD flag for the SID parameter estimation. For example, frames for which this measure is above a certain threshold may be considered as representative of the background noise and hence suitable for the SID parameter estimation. The measure may—as above—be based on SNR estimates. Then, according to this embodiment, the first SID frame after the end of the transmission of active speech frames may contain information about the specific set of frames to be used for SID parameter estimation.

As an example the set may comprise the n frames preceding the first SID frame. The encoding of which frames to use for SID parameter estimation can then be done with an N-max-bit code word, where each bit represents a respective frame preceding the first SID frame. If a bit in the code word is set (=1), the frame represented by the bit will be used for SID parameter estimation, otherwise not.

The SNR measure that is used in the above embodiments is only an example. Further, more advanced measures are possible. In general, a suitable measure must be a good indicator of whether the corresponding frame contains noise that is well representative for the inactivity noise signal. One such more advanced measure may for instance compare the power or the spectral properties of the current frame with the corresponding properties of recent frames or of other recent frames that have been identified to contain noise.

It might appear as a possibility in the normal bit stream of encoded frames to include a bit for signaling if the encoded frame is a hangover frame or not. However this is considered to be less advantageous since it would mean that one bit in every speech frame would have to be reserved for information that is only used after the ending of a speech burst.

While the above paragraphs discuss the DTX specific hangover, it is also common that already the VAD adds some hangover to avoid clipping in the speech offset. It would then be possible to allow the VAD specific hangover and the DTX hangover to overlap. For example, signal analysis may contribute to early hangover termination if there are a sufficient number of frames to generate a stable comfort noise, regardless of if the latest frames are from VAD hangover or DTX hangover.

Figure 6A:
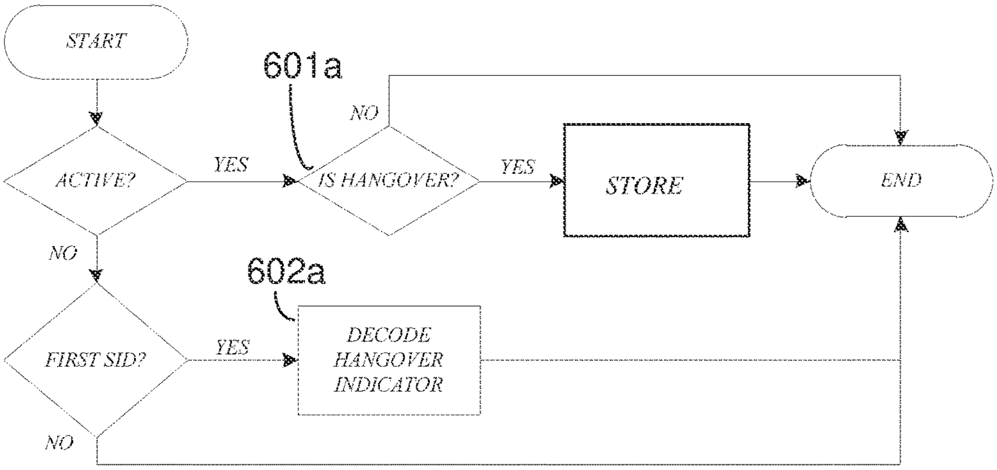
Figure 6B:
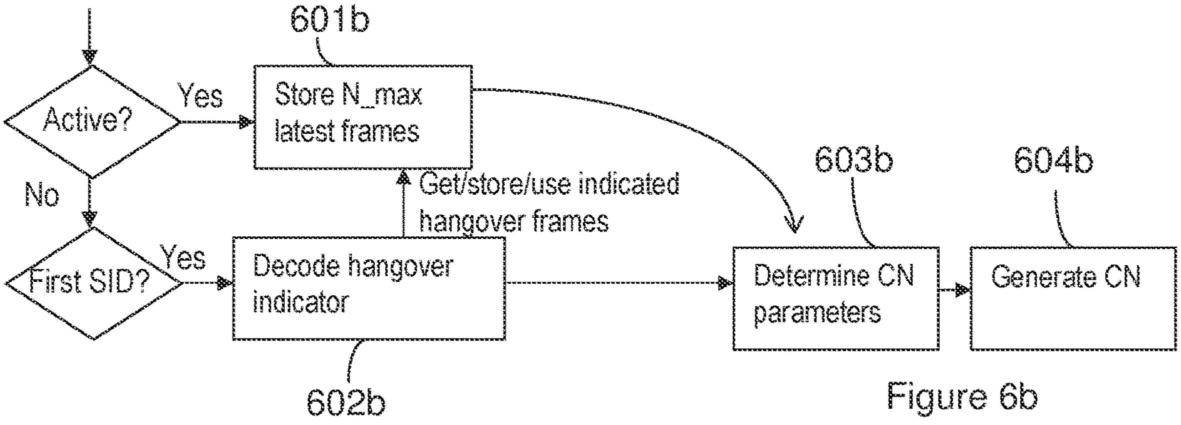

In FIG. 6*a*, a schematic flow-chart shows an exemplifying decoder-side hangover indicator decoder. In the example in 6*a*, it may be indicated in each frame if it is a hangover frame or not, and the hangover frames are then stored. From the decoded hangover indicator, it may be determined which of the stored hangover frames that should be used as base for comfort noise. Alternatively, the decision in 601*a*, of whether a frame is a hangover frame or not, is not taken until the hangover indicator is decoded in 602*a*. For the decision to be taken after the decoding 602*a*, a set of the most recently received frames needs to be stored in a buffer, e.g. of the length N_max (maximum number of hangover frames). In the latter case, the hangover frames may be identified in the set of frames which is currently stored in the buffer, based on the decoded hangover indicator, and thus parameters of at least part of the hangover frames may be stored. This is perhaps more clear from FIG. 6*b*, which shows the storing 601*b* of the latest N_max frames. When the hangover indicator is decoded in 602*b*, the hangover frames are present amongst the stored frames, and comfort noise parameters may be determined 603*b* based on the hangover frames indicated by the hangover indicator. Comfort noise may then be generated 604*b* based on the parameters. As in the encoder, the first SID flag may indicate if the current frame is the first SID following active signal coding. The first SID flag does not necessarily have to be stored in a variable, but can be derived from other decoder state variables.

Typical SID parameters are gain parameters and linear predictive spectral parameters like line spectral frequency (LSF) parameters. In an exemplifying embodiment, the decoder may take these parameters from the 5 preceding frames and calculate averages thereof. These averaged parameters may subsequently be used in the comfort noise synthesis of the DTX system. Alternatively, the SID parameters used for comfort noise synthesis may be determined from a specific set of the indicated hangover frames. The specific set may be derived at the decoder side using e.g. the received hangover length parameter and parameters from previously received frames that have been stored in a memory.

Even though the parameters derived from a set of hangover frames are mostly referred to as SID-parameters in this document, it would also be possible to use other parameters, differently denoted, but serving the same purpose, namely of being a base for generation of comfort noise.

The decoder may obtain, e.g. from the hangover indicator in the first SID frame after a sequence of active speech frames, information about the specific set of preceding frames that are to be used for SID parameter calculation. Then, the SID parameters may be calculated by using e.g. the gain and spectral parameters of the frames that are identified by received code. Assuming a codeword of n=8 bits is used as hangover indicator and this codeword contains the bit sequence "0 1 0 1 1 1 1 1" then the 5 directly preceding frames and the $7^{th}$ preceding frame are used. The gain and spectral parameters of these frames may be averaged and subsequently used in the comfort noise synthesis of the DTX system.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Exemplifying Method Performed by a Transmitting/Encoding Node, FIG. 7

An exemplifying method performed by a transmitting node or encoding node will be described below with reference to FIG. 7*a*. The transmitting node is operable to encode audio, such as speech, and to communicate with other nodes or entities, e.g. in a communication network. The transmitting node is further operable to apply a DTX scheme comprising transmission of SID frames during speech inactivity. The transmitting node may be e.g. a cell phone, a tablet, a computer or any other device capable of wired and/or wireless communication and of encoding of audio.

Figure 7A:
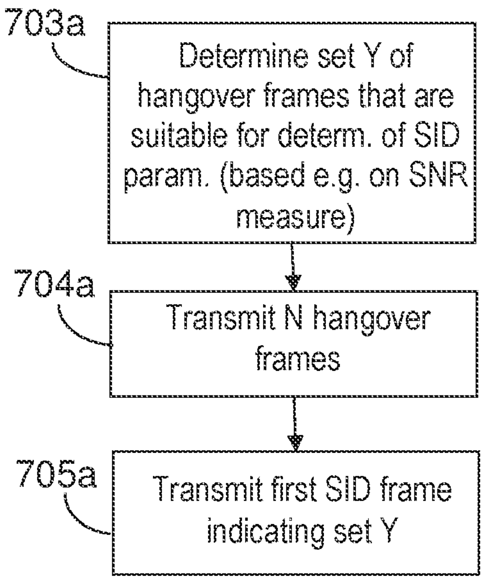

FIG. 7*a* illustrates the method comprising determining 703*a*, from amongst a number N of hangover frames, a set Y of frames being representative of background noise. The method further comprises transmitting 704*a* the N hangover frames, comprising said set Y of frames, to a receiving node. The method further comprises transmitting 705*a* a first SID frame to the receiving node in association with the transmission of the N hangover frames, where the SID frame comprises information indicating the determined set Y of hangover frames to the receiving node. The above method enables the receiving node to generate comfort noise based on the set Y of hangover frames.

The order of the actions in FIGS. 7*a* and *b* is only exemplifying. For example, the set Y could be determined after the N hangover frames have been transmitted.

The frames comprised in the set Y of hangover frames should be representative of background noise. Thus, out of the number N of hangover frames, the ones that are most suitable for determining or computing of parameters for generation of comfort noise, e.g. so-called SID-parameters should be identified. The frames of the set Y could be determined or identified e.g. based on a SNR level of the signal comprised in each frame, and when this SNR level fulfills a certain criterion, the frame is determined to be suitable for use as base for calculation of e.g. SID parameters. Some of the N hangover frames may be less representative of background noise. For example, some of the hangover frames may comprise, at least partly, speech or transient noise, which makes them unsuitable as base for deriving of parameters related to comfort noise generation. For example, speech frames generally have formant structures, which are not seen in the background noise; and transient noise frames can have higher energy than the average background noise. Such hangover frames, unrepresentative of background noise, should not be included in the set Y.

The set Y of frames may be indicated in different ways in the first SID frame, which will be further described below. By "first SID frame" is meant the first SID frame in a DTX period, typically indicating the start of the DTX period. By DTX period is here meant a period of speech inactivity, during which encoded frames are sent from the transmitting node to the receiving node at a lower bit rate and/or frame rate than during the non-DTX periods. By DTX period is here meant the period between active speech bursts, which period is replaced by comfort noise. These periods start with the first SID to mark the transition to comfort noise. This is then usually followed by periods of a number of "NO_DATA" frames, which as the name implies do not contain any data, and SID (or SID_UPDATE) frames. The SID frames are most often transmitted at regular intervals, denoted "SID interval", until the next utterance triggers a transition back to active speech encoding. That is, with a SID interval of 8, the DTX period would be encoded as: first SID followed by 7 NO_DATA frames before the SID_UPDATE. This sequence with 7 NO_DATA frames followed by a SID update is then repeated until the transition to active speech occurs.

An advantage of the above described method is, as previously described, that it enables a receiving node to derive parameters for comfort noise from frames that are determined to be suitable for this purpose. This improves the quality of the generated comfort noise, and thereby improves the user experience. The set Y is further indicated to the receiving node in a very resource efficient way, by utilizing the first SID frame for this purpose. It is an advantage to determine the suitable hangover frames in the transmitting node, since in this node, the real audio signal data is accessible, whereas in the receiving node, only a quantized version of the data is available.

The information indicating the set Y may comprise a number, implying a number of hangover frames in sequence; a codeword or bitmap indicating the positions of the frames belonging to the set Y, amongst the N hangover frames; a codeword or bitmap indicating some of the N hangover frames that are comprised in the set Y, and/or a codeword or bitmap indicating which of the N hangover frames that are not comprised in the set Y.

For example, the SID frame could comprise a number, e.g. 5, which should be interpreted, by the receiving node, e.g. as that the last five hangover frames should be used for determining parameters for generation of comfort noise. Alternatively the number could be interpreted as some other group of five frames amongst the N hangover frames, such as the last five but one. The number N of hangover frames could be e.g. 6, 7, 8 or 9. In a special case, the number N of hangover frames could be equal to the number indicated in the SID frame, i.e. the parameters should then be determined based on all the hangover frames.

Alternatively or in addition, the SID frame could comprise a codeword or bitmap/bitmask indicating the positions of the frames belonging to the set Y. Such a codeword could be configured in different ways. A code system could be used, where both the transmitter node and the receiver node have knowledge of the meaning of the codes, e.g. both sides have access to a codebook specifying e.g. that the codeword "01" maps to hangover frames, at frame k; k−1, k−2, k−4 and k−6 amongst the N hangover frames. Alternatively, a bitmap/bitmask could be used. Such a bitmap could cover all the N positions of the N hangover frames or a subset of the N positions. The receiving node should, at some point, have been previously informed of the character of the bitmap/bitmask. For example, if N=8, an exemplifying bitmap/bitmask such as "11011000" could be comprised in the SID frame, indicating that the $4^{th}$, $5^{th}$e $7^{th}$, and $8^{th}$ previous frames should be used for determining parameters for comfort noise. Alternatively, the bitmap/bitmask "11011" could be comprised in the first SID frame, having the same meaning as the previous example. Alternatively, the positions of the hangover frames which are not comprised in the set Y could be indicated. In analogy with the previous example, a corresponding bitmap/bitmask could then be "00100111" or "00100", or, "100111".

These are all different realizations of information that could be comprised in the first SID frame in order to indicate which of the hangover frames that should be used. Generally, the fewer bits that are needed to indicate the set Y, the better.

The above discussed concept of transmitting, in the first SID frame, an identification of the set of hangover frames to base the comfort noise generation on, may be combined with transmitting SID parameters as part of the first SID frame. That is, the first SID frame may further comprise SID parameters. These SID parameters will give an indication on how the signal looks in the current frame. This information could, for example, be weighed more than information from earlier hangover frames. Of course, already the hangover frames could be weighted differently without considering the signal parameters of the SID frame, but anyhow the decision to not go to DTX in the previous frame should indicate that we are not sufficiently sure that this frame represents inactivity/only background noise.

The number N of hangover frames may be dynamically variable, as previously described. The number N could be determined based on properties of an input audio signal. For example, the number N could depend on the speech sound forgoing the DTX period and/or the character of the background noise. By using a dynamic number of hangover frames, the number of hangover frames which need to be transmitted to a receiving node could be kept to a minimum, and thus resources could be saved, as compared to having a static number of hangover frames.

Figure 7B:
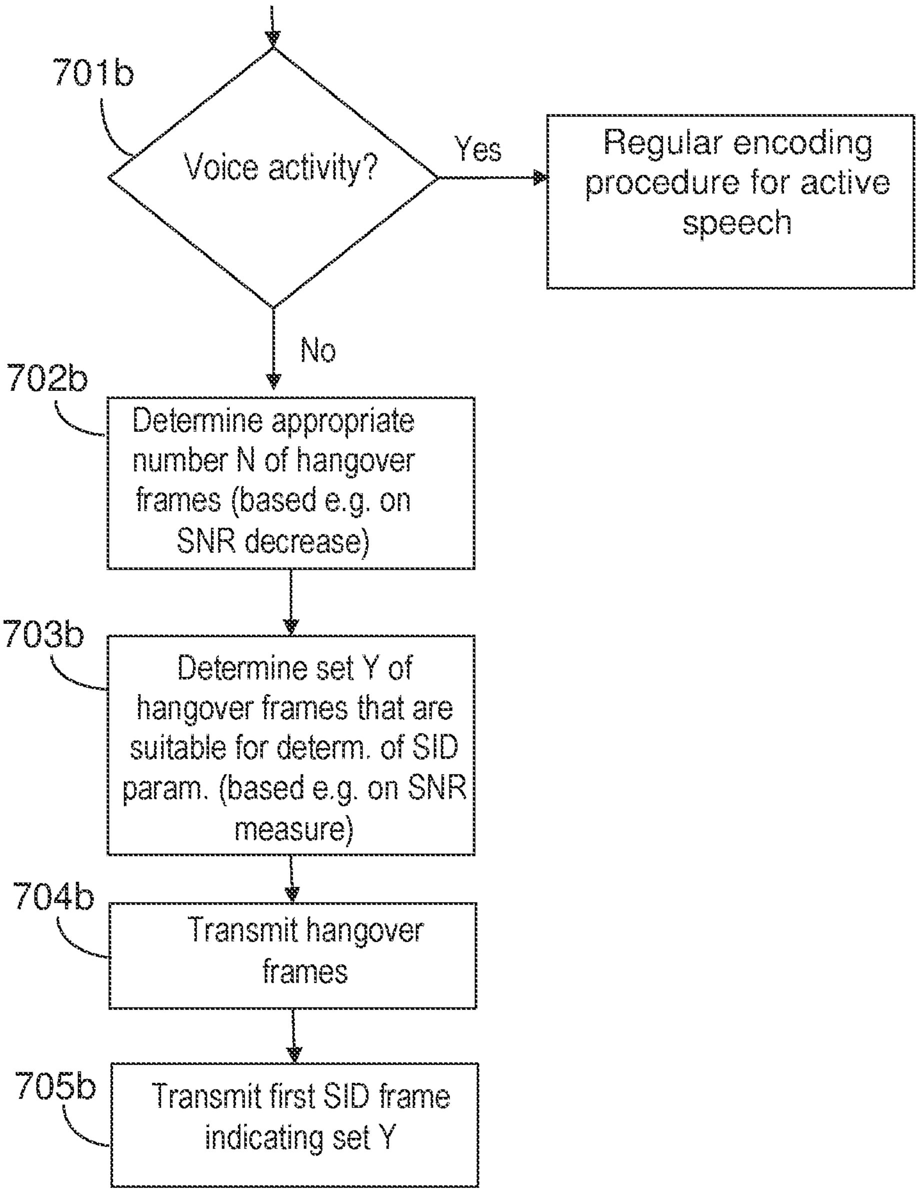

Some actions, which may precede the method illustrated in FIG. 7*a* are illustrated in FIG. 7*b*. In FIG. 7*b*, it is determined in an action **701*b* whether a frame of an audio stream, e.g. a segment of an audio signal, which signal at least partly comprises speech, comprises active speech or not. This is often referred to as Voice Activity Detection, VAD. When it is determined that one or more frames do not comprise active speech, a number of hangover frames are to be transmitted, e.g. in order to reduce the likelihood to cut a speech sound, as previously described. When applying a dynamic number of hangover frames, the signal comprised in the first frames determined not to comprise active speech may be analyzed, and a suitable number of hangover frames may be determined in an action 702*b***. Possibly, also properties of the last frames determined to comprise active speech may be taken in consideration when determining an appropriate number N of hangover frames, e.g. in order to determine an SNR or a frame energy decrease between adjacent frames.

That is, a number, N, of hangover frames may be determined based on a property of the signal comprised in the frames before and/or after a decision of speech inactivity. Further, or alternatively, properties of previous signal frames determined to comprise only background noise could be taken into consideration when determining N.

As previously mentioned, the determining of a number of hangover frames could be based on a characteristic of a decrease of SNR or energy within and/or between signal frames. The number N of hangover frames may be static, semi-static or dynamic, and could be different for different speech offsets.

The hangover frames transmitted to the receiving node, e.g. in action 704*b*, may be encoded in accordance with the encoding of frames comprising active speech, as previously described. When the number N of hangover frames is dynamic, the number N could also be indicated to the receiving node, e.g. in the first SID frame.

Exemplifying Method Performed by an Decoding Node, FIG. 8

An exemplifying method performed by a receiving node or decoding node will be described below with reference to FIG. 8. The decoding node is operable to decode audio, such as speech, and to communicate with other nodes or entities, e.g. in a communication network. The decoding node is further operable to apply a DTX scheme comprising reception of SID frames and generation of comfort noise during speech inactivity. The decoding node may be e.g. a cell phone, a tablet, a computer or any other device capable of wired and/or wireless communication and of decoding of audio.

The exemplifying method illustrated in FIG. 8 comprises receiving 801 N hangover frames from a transmitting node. Further, a first SID frame is received 802 in association with the N hangover frames. A set Y of hangover frames, from amongst the number N of hangover frames, is determined 803, based on information in the received SID frame. Further, comfort noise is generated 805, at least partially, based on the set Y of hangover frames.

The SID frame could be received after the last of the N hangover frames has been received, indicating the start of a DTX period. However, the SID frame could also be received before the hangover frames, or between two hangover frames, if this was allowed and regulated in the transmission protocol for the DTX scheme.

The number N of hangover frames could be indicated in the first SID frame, however, this is optional. The number N could alternatively be set to a default value, e.g. 7, implying that the 7 last received frames, not counting the SID frame, before a DTX period would be hangover frames. Further, when applying a dynamic number of hangover frames, there are other ways of signaling the number N of hangover frames. For example, the number could be signaled implicitly through properties of the audio signal, e.g. a long-term SNR measure. Such measure could be generated based on the decoded audio signal and could hence be made available at the decoder.

The SID frame comprises, as previously described, information indicating a set Y of frames, from amongst the N hangover frames, selected by the transmitting node as being representative of background noise. Therefore, it is possible for the receiving node to determine the set Y of frames based on the first SID frame. That is, based on the information comprised in the first SID frame indicating the set Y. The information could be explicit or implicit, and was exemplified above when describing the method performed by a transmitting node.

The receiving node is to generate comfort noise during silent DTX periods, i.e. during periods when no speech frames are received from a transmitting node. The comfort noise should preferably mimic the background noise at the transmitting node. In order to generate an as authentic comfort noise as possible, the receiving node should estimate the background noise based on the hangover frames which are most representative of the background noise. Alternatively or in addition, the receiving node could receive an estimate of the background noise from the transmitting node, e.g. in form of SID parameters. The SID frames are encoded at a significantly lower bitrate than the active signal frames. The characteristics of the background noise are therefore better captured, on the encoder side, during the hangover (from the hangover frames) than in the SID. However, the including of SID parameters in the first SID frame may be advantageous in order to have a smooth transition from hangover frames to comfort noise generation.

The receiving node estimates or derives parameters for generation of comfort noise, based on the set Y of frames. The parameters are associated with the background noise at the transmitting node side. By doing so, the comfort noise generated based on said parameters will reflect the background noise at the transmitter node side in a good way, and thus achieve a good/desired user experience. Selecting the set Y on the transmitter side is advantageous, since at that side, the full audio information is accessible, instead of the reduced, quantized version that is available on the receiver node side.

As previously described, the information indicating the set Y may comprise one or more of: a number, implying a number of hangover frames in sequence; a codeword or bitmap indicating the positions of the frames belonging to the set Y, amongst the N hangover frames; a codeword or bitmap indicating which of the N hangover frames that are at least comprised in the set Y; and a codeword or bitmap indicating which of the N hangover frames that are not comprised in the set Y.

Further, the first SID frame may further comprise SID parameters. The number N of hangover frames may be dynamically variable based on properties of an input audio signal, as previously described.

Exemplifying Transmitting Node, FIG. 9

Embodiments described herein also relate to a transmitting node, or encoding node. The transmitting node is associated with the same technical features, objects and advantages as the method described above and illustrated e.g. in FIGS. 7*a* and 7*b*. The transmitting node will be described in brief in order to avoid unnecessary repetition. The transmitting node could be e.g. a device or UE, such as a smart phone, a tablet, a computer or any other device capable of wired and/or wireless communication and of encoding of speech.

Below, an exemplifying transmitting node 900, adapted to enable the performance of an above described method adapted to perform at least one embodiment of the method in a transmitting node described above, will be described with reference to FIG. 9.

The transmitting node is operable to encode audio, such as speech, and is operable to communicate with other nodes or entities, e.g. in a communication network. The transmitting node is further operable to apply a DTX scheme comprising transmission of SID frames during speech inactivity. The transmitting node may be operable to communicate e.g. in a wireless communication system, such as GSM, UMTS, E-UTRAN or CDMA 2000, and/or in a wired communication system.

The part of the transmitting node which is mostly related to the herein suggested solution is illustrated as an arrangement 901 surrounded by a broken/dashed line. The arrangement and possibly other parts of the transmitting node are adapted to enable the performance of one or more of the methods or procedures described above and illustrated e.g. in FIGS. 7*a* and 7*b*.

The transmitting node illustrated in FIG. 9 comprises processing means, in this example in form of a processor 903 and a memory 904, wherein said memory is containing instructions 905 executable by said processor. The processing means are operative to determine, from amongst a number N of hangover frames, a set Y of frames being representative of background noise. The processing means being further operative to transmit the N hangover frames, comprising at least said set Y of frames, to a receiving node; and to transmit a first SID frame to the receiving node in association with the transmission of the N hangover frames, where the SID frame comprises information indicating the determined set Y of hangover frames to the receiving node.

The transmitting node enables a receiving node to generate comfort noise based on the set Y of hangover frames, thereby enabling generation of high-quality comfort noise.

The information indicating the set Y could be configured in different ways, and the first SID frame could further comprise SID parameters; and the number N of hangover frames could be variable or fixed, as previously described.

The transmitting node 900 is illustrated as to communicate with other entities via a communication unit 902, which may be considered to comprise conventional means for wireless and/or wired communication in accordance with a communication standard within which the transmitting node is operable. The arrangement and/or transmitting node may further comprise other functional units 909, for providing e.g. regular transmitting node functions, such as e.g. signal processing in association with encoding of speech.

The arrangement 901 may alternatively be implemented and/or schematically described as illustrated in FIG. 10. The arrangement 1001 comprises a determining unit 1004, for determining, a set Y of frames, out of a number N of hangover frames, being representative of background noise. The arrangement 1001 further comprises a transmitting unit for transmitting the N hangover frames, comprising, at least, said set Y of frames, to a receiving node; and further for transmitting a first SID frame to the receiving node in association with the transmission of the N hangover frames, where the SID frame comprises information indicating the determined set Y of hangover frames to the receiving node.

The arrangement 1001 may comprise a VAD unit, for determining whether a signal frame comprises active speech or not. Alternatively, such a VAD unit may be part of the other functional units 1008.

The arrangement 1001, and other parts of the transmitting node could be implemented e.g. by one or more of: a processor or a micro processor and adequate software and storage therefore, a Programmable Logic Device (PLD) or other electronic component(s)/processing circuit(s) configured to perform the actions mentioned above.

Exemplifying Receiving/Decoding Node, FIG. 11

Embodiments described herein also relate to a receiving node, or decoding node. The receiving node is associated with the same technical features, objects and advantages as the method described above and illustrated e.g. in FIG. 8. The receiving node will be described in brief in order to avoid unnecessary repetition. The receiving node could be e.g. a device or UE, such as a smart phone, a tablet, a computer or any other device capable of wired and/or wireless communication and of encoding of audio.

Below, an exemplifying receiving node 1100, adapted to enable the performance of an above described method adapted to perform at least one embodiment of the method in a receiving node described above, will be described with reference to FIG. 11.

The receiving node is operable to decode audio, such as speech, and is operable to communicate with other nodes or entities, e.g. in a communication network. The transmitting node is further operable to apply a DTX scheme comprising receiving of SID frames during speech inactivity. The receiving node may be operable to communicate in a wireless communication system, such as GSM, UMTS, E-UTRAN or CDMA 2000, and/or in a wired communication system.

The part of the receiving node which is mostly related to the herein suggested solution is illustrated as an arrangement 1101 surrounded by a broken/dashed line. The arrangement and possibly other parts of the receiving node are adapted to enable the performance of one or more of the methods or procedures described above and illustrated e.g. in FIG. 8.

The receiving node illustrated in FIG. 11 comprises processing means, in this example in form of a processor 1103 and a memory 1104 and wherein said memory is containing instructions 1105 executable by said processor. The processing means are operative to receive N hangover frames from a transmitting node; and further to receive a first SID frame in association with the N hangover frames. The processing means are further operative to determine, based on information in the received SID frame, a set Y of hangover frames, from amongst the number N of hangover frames; and to generate comfort noise at least partially based on the set Y of hangover frames.

The receiving node is thus enabled to generate comfort noise based on the set Y of hangover frames, and thereby enabled to generate high-quality comfort noise.

The information indicating the set Y could be configured in different ways, and the first SID frame could further comprise SID parameters; and the number N of hangover frames could be variable or fixed, as previously described.

The receiving node 1100 is illustrated as to communicate with other entities via a communication unit 1102, which may be considered to comprise conventional means for wireless and/or wired communication in accordance with a communication standard within which the receiving node is operable. The arrangement and/or receiving node may further comprise one or more storage units, 1106. The arrangement and/or receiving node may further comprise other functional units 1107, for providing e.g. regular receiving node functions, such as e.g. signal processing in association with decoding of speech.

The arrangement 1101 and other parts of the receiving or decoding node could be implemented e.g. by one or more of: a processor or a micro processor and adequate software and storage therefore, a Programmable Logic Device (PLD) or other electronic component(s)/processing circuit(s) configured to perform the actions mentioned above.

The arrangement 1101 may alternatively be implemented and/or schematically described as illustrated in FIG. 12. The arrangement 1201 comprises a receiving unit 1203 for receiving N hangover frames from a transmitting node; and further for receiving a first SID frame in association with the N hangover frames. The arrangement further comprises a determining unit 1204 for determining, based on information in the received first SID frame, a set Y of hangover frames, from amongst the number N of hangover frames;

and further a noise generator 1205 for generating comfort noise based on the set Y of hangover frames.

The arrangement 1201 may further comprise an estimating unit for estimating parameters for generation of comfort noise, such as e.g. SID parameters. The noise generator may then generate comfort noise based on the estimated noise generation parameters.

The arrangement 1201 and/or some other part of the decoding node 1200 is assumed to comprise functional units or circuits adapted to perform audio decoding.

The arrangement 1201 and other parts of the receiving or decoding node could be implemented e.g. by one or more of: a processor or a micro processor and adequate software and storage therefore, a Programmable Logic Device (PLD) or other electronic component(s)/processing circuit(s) configured to perform the actions mentioned above.

It is to be understood that the choice of interacting units or modules, as well as the naming of the units are only for exemplifying purpose, and client and server nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

By use of the herein suggested solution, the efficiency of speech transmissions with DTX may be increased without compromising the quality of the comfort noise synthesis at the end of talk spurts.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby.

Abbreviations

AMR Adaptive Multi-Rate
DTX Discontinuous Transmission
ITU-T International Telecommunication Union-Telecommunication standardization sector
LSF Linear Spectral Frequency
VAD Voice Activity Detector
3GPP Third Generation Partnership Project
SID Silence Insertion Descriptor
SNR Signal-to-Noise Ratio
WB Wide-Band

The invention claimed is:

1. An audio coding method comprising:

determining a number N of hangover frames, wherein the number N of hangover frames is variable;

transmitting the N hangover frames to an audio decoder;

transmitting a silence insertion descriptor (SID) frame to the audio decoder after transmitting the N hangover frames, wherein the SID frame comprises information indicating the determined number N of hangover frames.

2. The method of claim 1, wherein determining the number N of hangover frames comprises determining N based on properties of an input audio signal.

3. The method of claim 1, wherein the SID frame further comprises SID parameters.

4. An audio coding method comprising:

determining a number N of hangover frames, wherein the number N of hangover frames is variable;

transmitting the N hangover frames to an audio decoder;

transmitting a silence insertion descriptor (SID) frame to the audio decoder after transmitting the N hangover frames, wherein the SID frame comprises information indicating the determined number N of hangover frames, and the information indicating the determined number N of hangover frames comprises a counter value equal to N.

5. A non-transitory computer readable medium storing a computer program comprising computer program code which when executed by processing circuitry of an audio encoder causes the audio encoder to perform the method of claim 1.

6. An audio encoder, comprising:

a transmitter;

processing circuitry; and memory storing instructions for programming the processing circuitry to cause the audio encoder to perform a process comprising:

determining a number N of hangover frames, wherein the number N of hangover frames is variable;

transmitting the N hangover frames to an audio decoder;

transmitting a silence insertion descriptor (SID) frame to the audio decoder after transmitting the N hangover frames, wherein the SID frame comprises information indicating the determined number N of hangover frames.

7. The audio encoder of claim 6, wherein the information indicating the determined number N of hangover frames comprises a counter value equal to N.

8. The audio encoder of claim 6, wherein determining the number N of hangover frames comprises determining N based on properties of an input audio signal.

9. The audio encoder of claim 6, wherein the SID frame further comprises SID parameters.

10. A user equipment comprising an audio encoder of claim 6.

11. The user equipment of claim 10, wherein the user equipment is one of a smartphone, a tablet or a computer.

* * * * *